United States Patent
Koike et al.

(10) Patent No.: US 10,161,771 B2
(45) Date of Patent: *Dec. 25, 2018

(54) MEASUREMENT DEVICE FOR MEASURING AIRFLOW VOLUME AND A VENTILATION RESISTANCE AND HAVING A SPECIFIC OPENING FOR ALLOWING AN OPENING PLATE TO BE REPLACEABLE AND DIFFERENTIAL PRESSURE MEASUREMENT ARRANGEMENT

(71) Applicant: SANYO DENKI CO., LTD., Tokyo (JP)

(72) Inventors: Masahiro Koike, Tokyo (JP); Tomoaki Ikeda, Tokyo (JP); Takahisa Toda, Tokyo (JP); Yo Muramatsu, Tokyo (JP); Katsumichi Ishihara, Tokyo (JP); Hikaru Urushimoto, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 44 days.

This patent is subject to a terminal disclaimer.

(21) Appl. No.: 15/258,512

(22) Filed: Sep. 7, 2016

(65) Prior Publication Data

US 2017/0067765 A1 Mar. 9, 2017

(30) Foreign Application Priority Data

Sep. 9, 2015 (JP) ................................ 2015-177723

(51) Int. Cl.
*G01F 1/42* (2006.01)
*G01F 15/06* (2006.01)
(Continued)

(52) U.S. Cl.
CPC ................ *G01F 1/42* (2013.01); *F24F 11/89* (2018.01); *F24F 13/0209* (2013.01);
(Continued)

(58) Field of Classification Search
None
See application file for complete search history.

(56) References Cited

U.S. PATENT DOCUMENTS 4,619,138 A * 10/1986 Ohnhaus ................. G01F 15/00
73/198
8,757,008 B1 * 6/2014 Nelson ...................... G01F 1/44
73/861.42
(Continued)

FOREIGN PATENT DOCUMENTS

EP 3064904 A2 9/2016
FR 2651879 A1 3/1991
(Continued)

OTHER PUBLICATIONS

Extended European Search Report dated Feb. 3, 2017 issued in the corresponding European patent application No. 16183839.6.
(Continued)

*Primary Examiner* — Harshad R Patel
(74) *Attorney, Agent, or Firm* — Rankin, Hill & Clark LLP

(57) ABSTRACT

A measurement device includes: a casing that includes a first air duct with an air inlet; a straightening grid; a first chamber; an opening plate including an opening; a second chamber; pressure sensors configured to measure a first pressure, a second pressure, and a third pressure, the first pressure being air pressure from the air inlet to the straightening grid, the second pressure being air pressure in the first chamber, the third pressure being air pressure in the second chamber; a specific opening configured to allow the opening plate to be replaceable; an open/close portion configured to open and close the specific opening; and a duct forming a second air duct between the measurement device and a measurement target.

10 Claims, 9 Drawing Sheets

(51) Int. Cl.
*G01L 19/08* (2006.01)
*F24F 13/02* (2006.01)
*F24F 11/89* (2018.01)
*F15D 1/00* (2006.01)
*F24F 110/40* (2018.01)
*F24F 11/52* (2018.01)

(52) U.S. Cl.
CPC ........ *F24F 13/0218* (2013.01); *G01F 15/068* (2013.01); *G01L 19/083* (2013.01); *F15D 1/001* (2013.01); *F24F 11/52* (2018.01); *F24F 2110/40* (2018.01)

(56) References Cited

U.S. PATENT DOCUMENTS

| | | | | |
|---|---|---|---|---|
| 2003/0130809 | A1* | 7/2003 | Cohen | A01K 1/031 702/45 |
| 2003/0154803 | A1* | 8/2003 | Modera | G01F 1/363 73/861.52 |
| 2010/0143125 | A1* | 6/2010 | Vogel | F04D 27/006 416/61 |
| 2013/0118525 | A1* | 5/2013 | Fuchigami | B08B 7/02 134/7 |
| 2015/0198468 | A1* | 7/2015 | Brugger | G01F 1/05 73/861 |
| 2016/0258791 | A1* | 9/2016 | Ishihara | G01F 1/34 |
| 2017/0045255 | A1* | 2/2017 | Karamanos | G05D 7/0635 |
| 2017/0045389 | A1* | 2/2017 | Wolgamott | F24F 11/001 |
| 2017/0052045 | A1* | 2/2017 | Ishihara | G01F 15/00 |
| 2017/0067765 | A1* | 3/2017 | Koike | G01F 1/42 |

FOREIGN PATENT DOCUMENTS

| | | |
|---|---|---|
| JP | 2004309202 | 11/2004 |
| JP | 2005207832 | 8/2005 |
| JP | 2013064572 A2 | 4/2013 |
| WO | 2004/063676 | 7/2004 |

OTHER PUBLICATIONS

Office Action dated Jan. 2, 2018 for the corresponding European Patent Application No. 16183839.6.

* cited by examiner

MEASUREMENT DEVICE FOR MEASURING AIRFLOW VOLUME AND A VENTILATION RESISTANCE AND HAVING A SPECIFIC OPENING FOR ALLOWING AN OPENING PLATE TO BE REPLACEABLE AND DIFFERENTIAL PRESSURE MEASUREMENT ARRANGEMENT

CROSS-REFERENCE TO RELATED APPLICATION

This application claims priority from Japanese Patent Application No. 2015-177723 filed with the Japan Patent Office on Sep. 9, 2015, the entire content of which is hereby incorporated by reference.

BACKGROUND

1. Technical Field

Embodiments of the present disclosure relate to a measurement device that measures an airflow volume and a ventilation resistance.

2. Description of the Related Art

There has been known a measurement device that measures an airflow volume. For example, the technique disclosed in JP-A-2004-309202 cools a thermosensor (a thermal sensor) by sending air. This measures an airflow volume based on a temperature difference in the thermosensor before and after sending the air. This technique has been widely known.

A pressure sensor that measures an airflow volume has also been known. For example, the technique disclosed in JP-A-2005-207832 includes the nozzle, which generates differential pressure of air between the first chamber and the second chamber. An airflow volume is measured on the basis of the differential pressure of air between the first chamber and the second chamber, the opening area of the nozzle, and the like.

SUMMARY

A measurement device for measuring an airflow volume and a ventilation resistance includes: a casing that includes a first air duct with an air inlet, the air inlet being configured to take in air; a straightening grid provided in the first air duct, the straightening grid being configured to straighten the air taken from the air inlet; a first chamber provided in the first air duct, in which air that has passed through the straightening grid is taken; an opening plate provided in the first air duct, the opening plate including an opening allowing the air taken in the first chamber to pass therethrough; a second chamber provided in the first air duct, in which air that has passed through the opening of the opening plate is taken; pressure sensors provided to the first air duct, the pressure sensors being configured to measure a first pressure, a second pressure, and a third pressure, the first pressure being air pressure from the air inlet to the straightening grid, the second pressure being air pressure in the first chamber, the third pressure being air pressure in the second chamber; a specific opening disposed in a part of the first air duct, the specific opening being configured to allow the opening plate to be replaceable; an open/close portion configured to open and close the specific opening; and a duct forming a second air duct between the measurement device and a measurement target.

DESCRIPTION OF THE EMBODIMENTS

Figure 1:
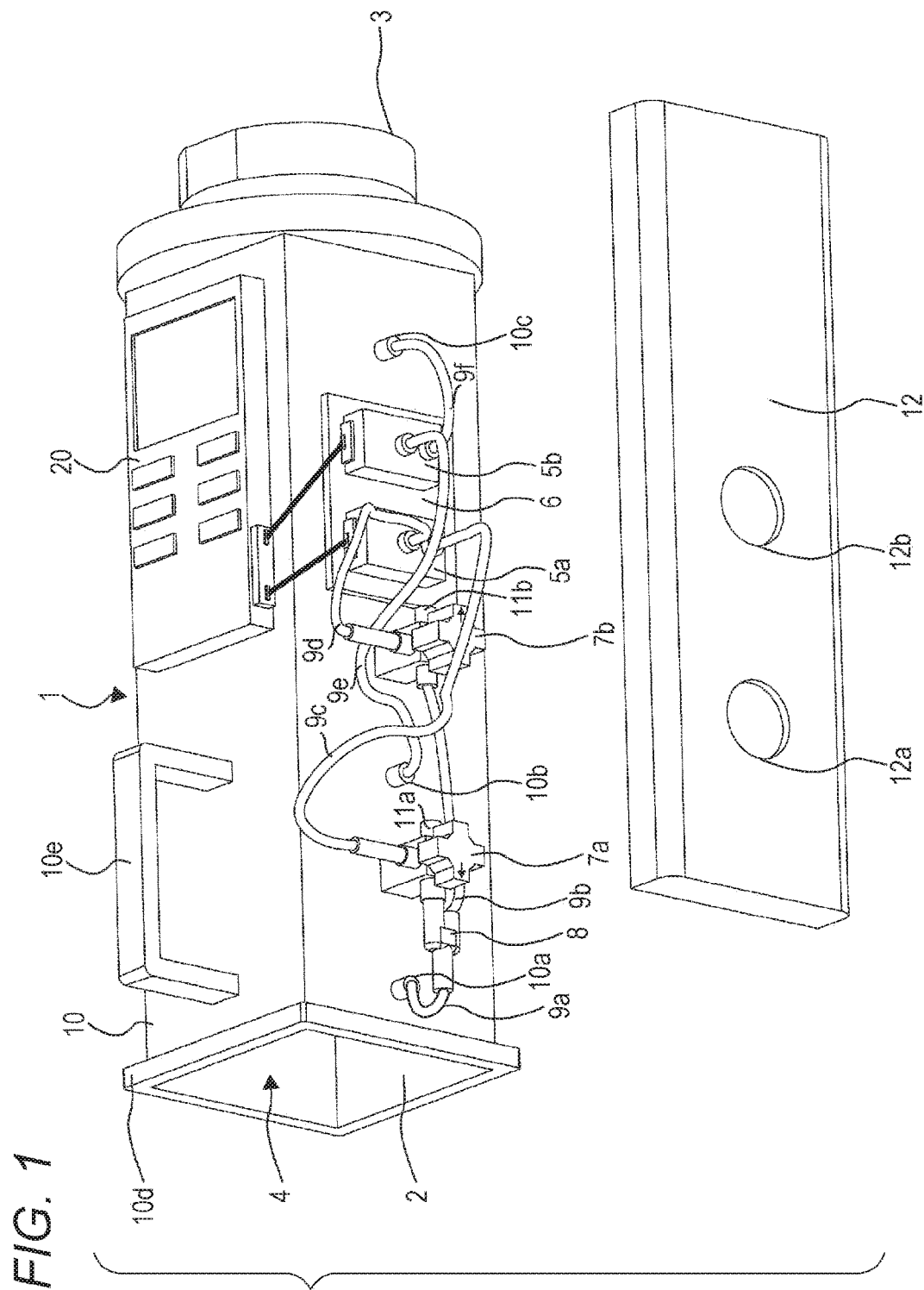
FIG. 1 is a perspective view illustrating an example of a measurement device according to an embodiment of the present disclosure viewed from a first direction.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The technique that measures the airflow volume using the thermosensor (the thermal sensor), which is as disclosed in JP-A-2004-309202, ensures downsizing the measurement device. However, the measurement device can measure only the airflow volume; therefore, measuring a ventilation resistance against the airflow volume is difficult.

The technique that measures the airflow volume using the pressure sensor, which is as disclosed in JP-A-2005-207832, ensures measuring the airflow volume and the ventilation resistance. As long as the airflow volume is within the range supported by the predetermined size of chamber, opening area of the nozzle, and the like, this technique ensures the measurement. However, with this technique, it is difficult to measure the airflow volumes and the ventilation resistances in various ranges of a device flowing wind such as a server, for example, an information base station, a power supply, a measuring instrument, a ventilating fan, an air curtain, an exhaust duct, a compressor, and a fan (hereinafter referred to as a "wind-blowing apparatus"). In view of this, this technique is poor in versatility.

The technique disclosed in JP-A-2005-207832, for example, needs a nozzle with large opening area to measure a large airflow volume. On the other hand, to measure a small airflow volume, the technique needs a nozzle with small opening area. That is, the use of the nozzle with small opening area for measurement of large airflow volume, for example, generates a whirl of air current returned from the nozzle; therefore, it is difficult to obtain an optimum pressure difference. On the other hand, the use of the nozzle with large opening area for measurement of small airflow volume results in a slight value of pressure difference between the chambers. This considerably deteriorates accuracies of measurements of the airflow volume and the ventilation resistance.

Additionally, the relationship between the sizes of the chambers and the position of the opening disposed on the nozzle affects the range of measurable airflow volume. Accordingly, the technique disclosed in JP-A-2005-207832 ensures only measurement of the airflow volume and the ventilation resistance supported by the predetermined size of chamber, position of the opening disposed on the nozzle, and the like.

One object of the present disclosure is to provide a measurement device that measures the airflow volume and the ventilation resistance, the measurement device having high versatility and supporting airflow volumes in various ranges.

A measurement device for measuring an airflow volume and a ventilation resistance according to an aspect of the present disclosure (the present measurement device) includes: a casing that includes a first air duct with an air inlet, the air inlet being configured to take in air; a straightening grid provided in the first air duct, the straightening grid being configured to straighten the air taken from the air inlet; a first chamber provided in the first air duct, in which air that has passed through the straightening grid is taken; an opening plate provided in the first air duct, the opening plate including an opening allowing the air taken in the first chamber to pass therethrough; a second chamber provided in the first air duct, in which air that has passed through the opening of the opening plate is taken; pressure sensors provided to the first air duct, the pressure sensors being configured to measure a first pressure, a second pressure, and a third pressure, the first pressure being air pressure from the air inlet to the straightening grid, the second pressure being air pressure in the first chamber, the third pressure being air pressure in the second chamber; a specific opening disposed in a part of the first air duct, the specific opening being configured to allow the opening plate to be replaceable; an open/close portion configured to open and close the specific opening; and a duct forming a second air duct between the measurement device and a measurement target.

In the present measurement device, the open/close portion can open the side surface of the air duct. Therefore, various kinds of opening plates can be installed. This ensures high versatility of the present measurement device. Additionally, when the size of the chamber is employed as a criterion, the opening area and the position of the opening of the opening plate can also be determined according to the size of the chamber. This prevents an increase in the size of the chamber more than necessity. That is, downsizing of the present measurement device can also be ensured.

In addition, in the present measurement device, the duct may include a first opening that is installed to the measurement device, and a second opening that is installed to the measurement target, and an opening size of the second opening may be larger than that of the first opening.

Moreover, in the present measurement device, the duct may include an air duct wall member that forms an air duct wall of the second air duct, and the air duct wall member may be formed of a foldable material.

Furthermore, in the present measurement device, the casing may be made of a resin material, and to the casing, a control board and a display may be mounted, the control board being coupled to the pressure sensors and configured to calculate the airflow volume and the ventilation resistance, the display being configured to display the airflow volume and ventilation resistance calculated by the control board.

This ensures weight reduction of the casing. Since the control board and the display are mounted to the casing, functions regarding measurement, calculation, and display are collected to one. This ensures carrying the present lightweight measurement device and measuring the airflow volume and ventilation resistance of a wind-blowing apparatuses at various locations.

In addition, in the present measurement device, the control board may be configured to calculate the airflow volume on the basis of a differential pressure between the second pressure and the third pressure and to calculate the ventilation resistance on the basis of the calculated airflow volume and the first pressure.

Moreover, the present measurement device may further include an assistant fan disposed at an air outlet, the air outlet being disposed opposite to the air inlet in the first air duct, the assistant fan being configured to send out air in the first air duct to outside.

This assistant fan ensures restraining a reduction in the airflow volume of the air sent from the measurement-target wind-blowing apparatus due to an unintended load caused by the shape of the air duct itself or the like. As a result, an appropriate airflow volume suitable for measurement can be held. This ensures measuring the airflow volume and the ventilation resistance more accurately.

The present measurement device ensures supporting airflow volumes in various ranges, thus having high versatility.

Figure 2:
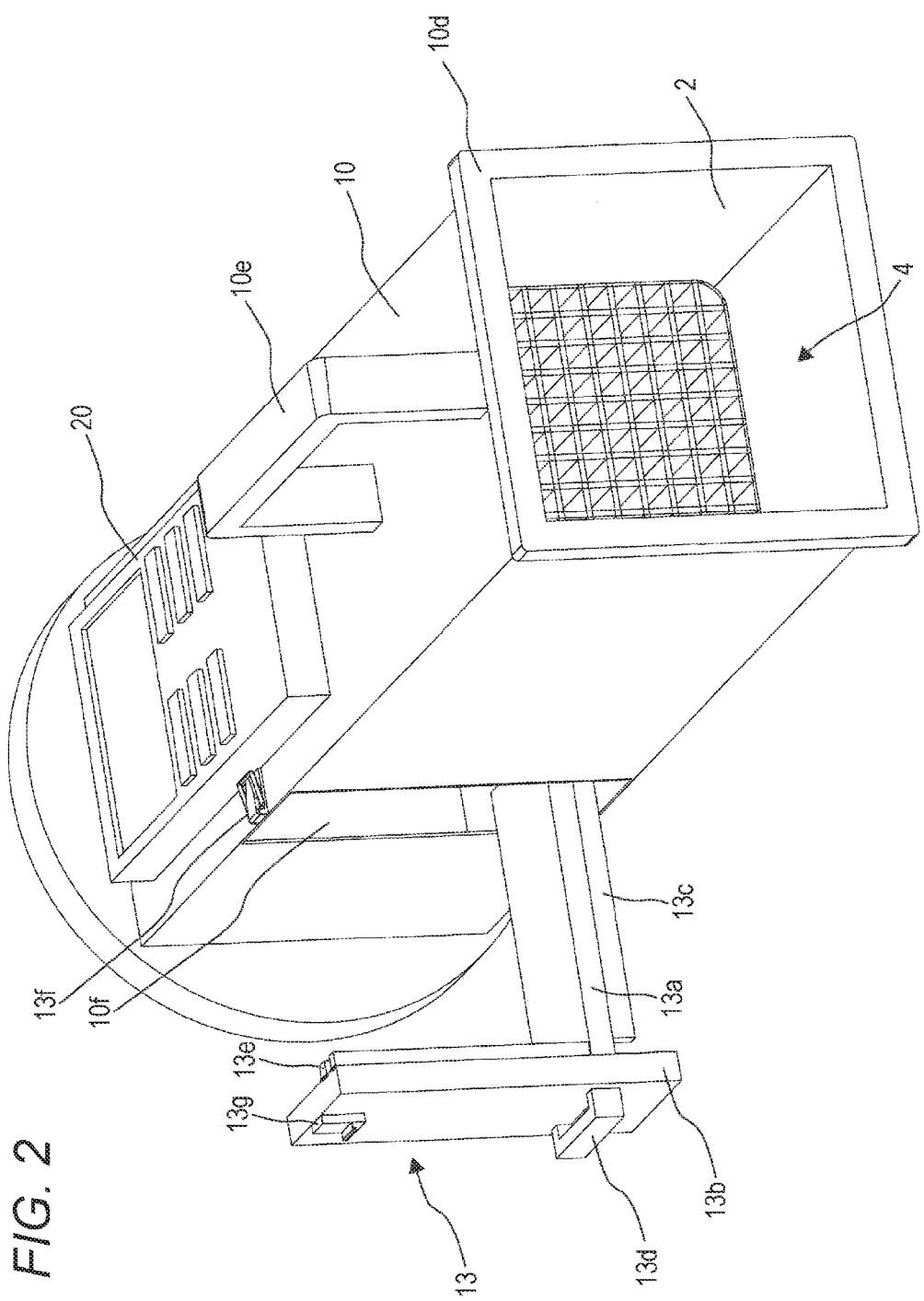
FIG. 2 is a perspective view illustrating an example of the measurement device viewed from a second direction.

The following describes embodiments according to the present disclosure. FIG. 1 is a perspective view illustrating an example of a measurement device 1 according to an embodiment viewed from a first direction. FIG. 2 is a perspective view illustrating an example of the measurement device 1 viewed from a second direction, which is a direction different from the first direction.

The measurement device 1 measures the airflow volume and the ventilation resistance of a wind-blowing apparatus. As illustrated in FIGS. 1 and 2, the measurement device 1 includes a casing (housing) 10. The casing 10 includes an air duct 4. The air duct 4 communicates with an air inlet 2 and an air outlet 3. The air inlet 2 takes air sent from the outside (for example, air from the wind-blowing apparatus) into the air duct 4. The air outlet 3 sends out the taken air to the outside of the air duct 4.

A controller 20 is mounted to the top surface of the casing 10. The controller 20 performs control to measure the airflow volume and the ventilation resistance.

As illustrated in FIG. 1, on a first side surface, which is a surface in the first direction on the casing 10, a relay board 6, a first valve 7a and a second valve 7b, a distributor 8, and a plurality of tubes 9a to 9f are mounted. On the relay board 6, a first pressure sensor 5a and a second pressure sensor 5b, which measure air pressure, are mounted. The first valve 7a and the second valve 7b adjust delivery of air to the first pressure sensor 5a. The distributor 8 distributes the air to two flow passages.

The first pressure sensor 5a and the second pressure sensor 5b, which are mounted to the relay board 6, are sensors to measure the air pressure. The first pressure sensor 5a and the second pressure sensor 5b are differential pressure sensors having two input ports. Specifically, the first pressure sensor 5a and the second pressure sensor 5b include the one (upper) input port, which is the positive input port, and the other (lower) input, which is the negative input port. In this embodiment, the first pressure sensor 5a and the second pressure sensor 5b are mounted to the relay board 6. Alternatively, the measurement device 1 may not include the relay board 6. In this case, the first pressure sensor 5a and the second pressure sensor 5b may be directly mounted to the casing 10 (the first side surface of the casing 10).

Figure 3:
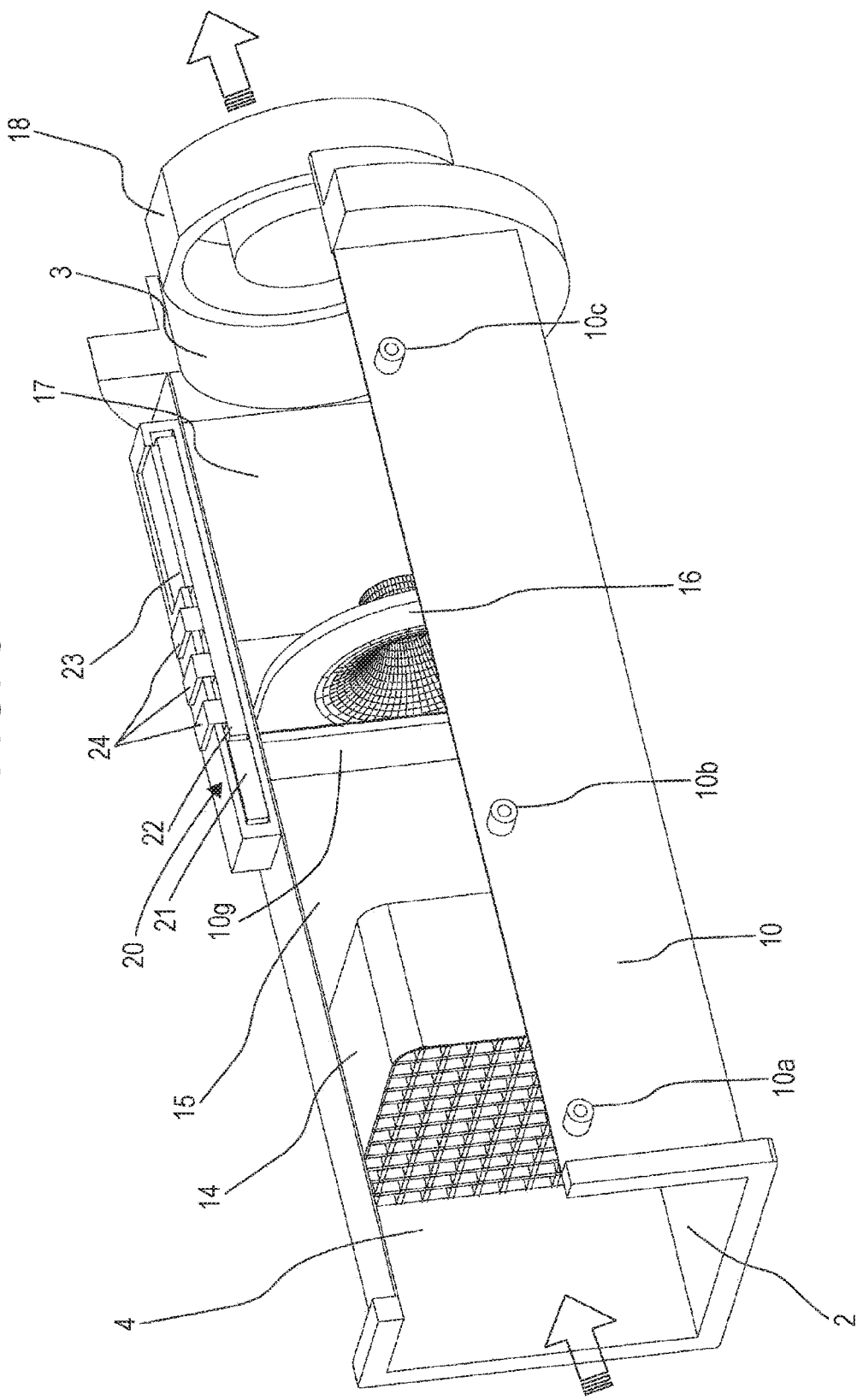
FIG. 3 is a cross-sectional explanatory view illustrating an example of the measurement device.

Here, on the first side surface of the casing 10, to measure the air pressure in the air duct 4, three holes, namely, a first opening 10a, a second opening 10b, and a third opening 10c are formed (see FIGS. 1 and 3).

To the first opening 10a, one end of a first tube 9a is coupled. To the other end of the first tube 9a, the distributor 8 is coupled.

The distributor 8 is coupled to the first tube 9a, a second tube 9b, and the first valve 7a. The distributor 8 distributes air input through the first tube 9a to the second tube 9b and the first valve 7a.

The first valve 7a has three ports. To the two ports of the first valve 7a, the respective distributor 8 and third tube 9c are coupled. The remaining one port of the first valve 7a is a first outside air port 11a to take in outside air. At the first valve 7a, rotation of a cross-shaped adjuster (adjustment of the first valve 7a) switches the air sent out to the third tube 9c. That is, the first valve 7a ensures switching (adjusting) the air sent out to the third tube 9c between the air from the first opening 10a input through the distributor 8 and the outside air input through the first outside air port 11a.

For example, assume that the arrow, which is illustrated in FIG. 1, of the adjuster at the first valve 7a indicates the relay board 6 side or the upper side. Then, the first valve 7a sends out the outside air, which is input through the first outside air port 11a, to the third tube 9c. On the other hand, assume that the arrow of the adjuster at the first valve 7a indicates the distributor 8 side or the lower side. Then, the first valve 7a sends out the air, which is input from the first opening 10a through the distributor 8, to the third tube 9c.

The third tube 9c, which is coupled to the first valve 7a, is coupled to the negative input port of the first pressure sensor 5a. In view of this, to the negative input port of the first pressure sensor 5a, any of the air from the first opening 10a or the outside air input through the first outside air port 11a is input.

The second valve 7b also has three ports similar to the first valve 7a. To the two ports of the second valve 7b, the respective second tube 9b and fourth tube 9d are coupled. The remaining one port of the second valve 7b is a second outside air port 11b to take in the outside air. At the second valve 7b, rotation of a cross-shaped adjuster (adjustment of the second valve 7b) switches the air sent out to the fourth tube 9d. That is, the second valve 7b ensures switching (adjusting) the air sent out to the fourth tube 9d between the air from the first opening 10a input through the second tube 9b and the outside air input through the second outside air port 11b.

For example, assume that the arrow, which is illustrated in FIG. 1, of the adjuster at the second valve 7b indicates the distributor 8 side or the lower side. Then, the second valve 7b sends out the air, which is input from the first opening 10a through the second tube 9b, to the fourth tube 9d. On the other hand, assume that the arrow of the adjuster at the second valve 7b indicates the relay board 6 side or the upper side. Then, the second valve 7b sends out the outside air, which is input through the second outside air port 11b, to the fourth tube 9d.

The fourth tube 9d, which is coupled to the second valve 7b, is coupled to the positive input port of the first pressure sensor 5a. In view of this, to the positive input port of the first pressure sensor 5a, any of the air from the first opening 10a or the outside air input through the second outside air port 11b is input.

Accordingly, the adjustment of the first valve 7a and the second valve 7b ensures selecting the following case (1) or (2).

(1) A case where the air from the first opening 10a is input to the positive input port of the first pressure sensor 5a and the outside air is input to the negative input port of the first pressure sensor 5a (2) A case where the outside air is input to the positive input port of the first pressure sensor 5a and the air from the first opening 10a is inputs to the negative input port of the first pressure sensor 5a The adjustment of the first valve 7a and the second valve 7b also ensures inputting identical air (air pressure) to the positive input port and the negative input port of the first pressure sensor 5a. In this case, a determination result by the controller 20 turns out to be an error.

Thus, the measurement device 1 includes the first valve 7a and the second valve 7b. Accordingly, the air input to the positive input port and the negative input port of the first pressure sensor 5a is selectable from any of the air from the first opening 10a and the outside air. Therefore, when the airflow volume and the ventilation resistance of the wind-blowing apparatus are measured (when the air is sent from the measurement-target wind-blowing apparatus), the air pressure from the first opening 10a being a value smaller than pressure of outside air (atmospheric pressure) ensures restraining static pressure of the air through the first opening 10a being negative. That is, the measurement value of the first pressure sensor 5a, which is the differential pressure sensor, can be a positive value.

To the second opening 10b, one end of a fifth tube 9e is coupled. To the other end of the fifth tube 9e, the positive input port of the second pressure sensor 5b is coupled. To the third opening 10c, one end of a sixth tube 9f is coupled. To the other end of the sixth tube 9f, the negative input port of the second pressure sensor 5b is coupled.

In view of this, to the positive input port of the second pressure sensor 5b, the air from the second opening 10b is input. To the negative input port of the second pressure sensor 5b, the air from the third opening 10c is input.

For protection of the above-described relay board 6 to which the first pressure sensor 5a and the second pressure sensor 5b are mounted, distributor 8, and plurality of tubes 9a to 9f from the outside, a protective cover 12 is mounted to the first side surface of the casing 10. In the example illustrated in FIG. 1, to show the relay board 6 and the like, the protective cover 12 is removed.

On the protective cover 12, a first adjusting opening 12a and a second adjusting opening 12b are formed. The first adjusting opening 12a and the second adjusting opening 12b have openings larger than the cross-shaped adjusters of the first valve 7a and the second valve 7b such that the first valve 7a and the second valve 7b can be adjusted even when the protective cover 12 is mounted to the casing 10. The first adjusting opening 12a is formed on a site (a surface) facing the adjuster of the first valve 7a on the protective cover 12 mounted to the casing 10. The second adjusting opening 12b is formed on a site (a surface) facing the adjuster of the second valve 7b on the protective cover 12 mounted to the casing 10.

A flange 10d is formed on the outer peripheral surface on the air inlet 2 side of the casing 10. The flange 10d locks a coupling duct 30 (see FIG. 6), which will be described later.

For easily carrying the measurement device 1, a handle 10e is formed on the top surface portion of the casing 10.

Especially, in this embodiment, the casing 10 may be made (formed) of a resin material such as nylon, polyacetal, fluoroplastic, ABS resin, polyethylene, polypropylene, polycarbonate, polyvinyl chloride resin, phenolic resin, methacrylate resin, melamine resin, urea resin, and polyurethane. This ensures weight reduction of the measurement device 1 (the casing 10). The casing 10 is probably cooled by air sent from the measurement-target wind-blowing apparatus and is heated by warm air (hot air) from the measurement-target wind-blowing apparatus. Accordingly, to restrain cooling or heating of the handle 10e and the controller 20, the casing 10 is preferably made of a resin material having low thermal conductivity.

Thus, the casing 10 made of resin material ensures the weight reduction of the measurement device 1 (the casing 10). Furthermore, the handle 10e is formed on the top surface portion of the casing 10. This ensures easily carrying the measurement device 1.

As illustrated in FIG. 2, on a second side surface, which is a surface in the second direction on the casing 10, a specific opening 10f is formed. The specific opening 10f is disposed to ensure replacing an opening plate 16 (see FIGS. 3, 4A, and 4B), which will be described later. The specific opening 10f is disposed on a site (an opposed surface) opposed to the side surface of the opening plate 16 on the second side surface (the side surface of the air duct 4) of the casing 10. That is, the specific opening 10f is disposed at a part of the air duct 4.

The specific opening 10f is open at a size such that the opening plate 16 is insertable into/removable from the air duct 4. That is, the specific opening 10f has a size to allow the opening plate 16 to be replaced. The specific opening 10f includes an open/close portion 13, which is slidable in a vertical or an approximately vertical direction with respect to the longitudinal direction of the air duct 4.

This open/close portion 13 is an open/close member to open and close the specific opening 10f. The open/close portion 13 includes a base 13a and a side plate 13b, which obstructs the specific opening 10f (closes the opening).

The open/close portion 13 includes a guide rail 13c on the back surface of the base 13a. The guide rail 13c movably engages a slider (not illustrated), which is disposed inside the air duct 4. This configures the slidable open/close portion 13.

The side plate 13b includes a side plate handle 13d, which is to grip the open/close portion 13, a restricting portion 13e, and an open/close lock 13g. When the specific opening 10f is closed, the restricting portion 13e causes the opening plate 16 to be disposed upright on the air duct 4 and restricts the movement of the opening plate 16 in the longitudinal direction of the air duct 4. The open/close lock 13g is constituted so as to lock with a body lock 13f, which is mounted to the casing 10. Locking the open/close lock 13g to the body lock 13f holds the closed state of the specific opening 10f by the open/close portion 13 (the side plate 13b).

Accordingly, gripping the side plate handle 13d and sliding the open/close portion 13 allows opening and closing the specific opening 10f. Opening the specific opening 10f allows replacing the opening plate 16 with one that supports the airflow volume from the measurement-target wind-blowing apparatus. This allows the measurement device 1 to support the airflow volumes in various ranges (have high versatility).

In this embodiment, the open/close portion 13 is slidably constituted. Alternatively, the open/close portion 13 (the side plate 13b) may be constituted such that the one end side is journaled to the casing 10 and the other end side is openable. In this case, the open/close portion 13 (the side plate 13b) is openably/closably constituted like a door.

The specific opening 10f and the open/close portion (the open/close member) 13 form a part of the air duct 4 of the measurement device 1 and are included in an opening member replacing mechanism, which ensures replacement of the opening plate 16.

FIG. 3 is a cross-sectional explanatory view illustrating an example of the measurement device 1. From the measurement device 1 illustrated in this drawing, the relay board 6, the first valve 7a, the second valve 7b, the distributor 8, the plurality of tubes 9a to 9f, and the protective cover 12 are removed. Furthermore, a part of the casing 10 is removed.

As illustrated in FIG. 3, the air duct 4 includes a straightening grid 14, a first chamber 15, the opening plate 16, a second chamber 17, and an assistant fan 18. The straightening grid 14 straightens the air taken from the air inlet 2. In the first chamber 15, the air that has passed through the straightening grid 14 is taken. The opening plate (the opening member) 16 has an opening through which the air taken in the first chamber 15 can be passed. That is, the opening plate 16 is installed in the air duct and has the opening through which the air taken from the air inlet 2 can be passed. The second chamber 17 takes in the air that has passed through the opening of the opening plate 16. The assistant fan 18 sends out the air in the air duct 4 (the air inside the second chamber 17) to the outside.

At the inside of the casing 10, one upright-holder 10g, which holds the opening plate 16 to be disposed upright on the air duct 4, is formed.

The straightening grid 14 is constituted so as to have a rectangular grid shape. The straightening grid 14 straightens the air sent from the measurement-target wind-blowing apparatus.

The first chamber 15 forms a space from the straightening grid 14 to the opening plate 16. The second chamber 17 forms a space from the opening plate 16 to the assistant fan 18.

The above-described first opening 10a is formed between the air inlet 2 and the straightening grid 14. The first opening 10a is disposed to measure air pressure before the air passes through the straightening grid 14. The second opening 10b is formed at the first chamber 15. The second opening 10b is disposed to measure pressure of the air in the first chamber 15 (the air before passing through the opening plate 16). The third opening 10c is formed at the second chamber 17. The third opening 10c is disposed to measure pressure of the air in the second chamber 17 (the air after passing through the opening plate 16).

The assistant fan 18 is provided on the air outlet 3 side. The assistant fan 18 assists the air in the air duct 4 sent from the measurement-target wind-blowing apparatus to be sent out to the outside. This assistant fan 18 is a fan made of metal so as to ensure supporting the large airflow volume of the air sent from the measurement-target wind-blowing apparatus. For weight reduction, the assistant fan 18 may be a fan made of resin.

When the air sent from the measurement-target wind-blowing apparatus passes through the air duct 4, this assistant fan 18 allows restraining a reduction in the airflow volume of the air sent from the measurement-target wind-blowing apparatus due to a load (pressure loss) caused by the shape of the air duct 4 itself and an unintended load caused by the length of the air duct 4 in the longitudinal direction or the like. Consequently, an appropriate airflow volume suitable for measurement can be held. That is, disposing the assistant fan 18 ensures configuring the measurement device 1 to be an axial blower that corresponds to the measurement-target wind-blowing apparatus, that is, the air duct 4 of the measurement device 1 is configured to imitate the air duct of the measurement-target wind-blowing apparatus.

Figure 4B:
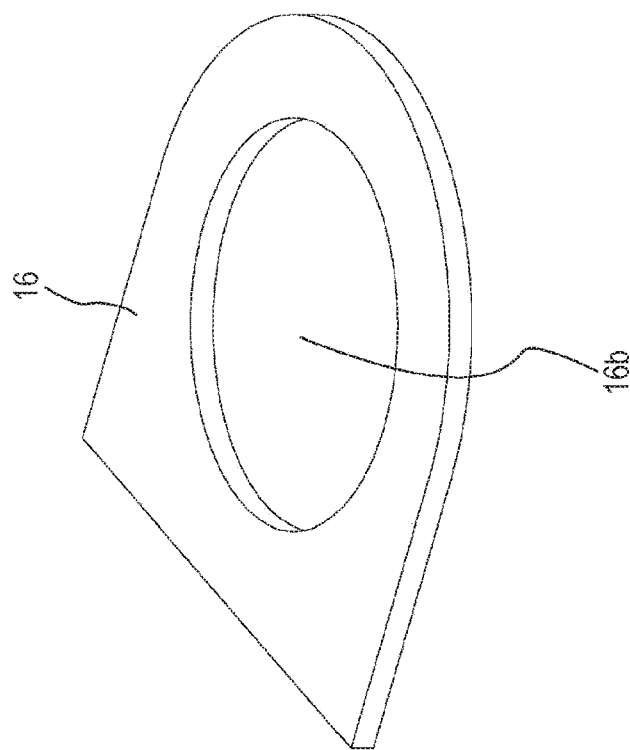
FIGS. 4A and 4B are perspective views illustrating an example of an opening plate of the measurement device.
Figure 4A:
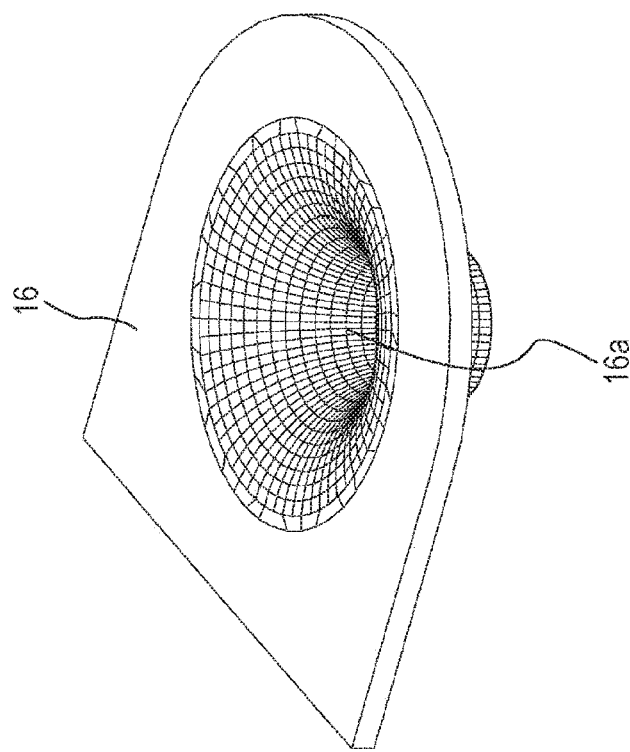

The opening plate 16 purposely generates a pressure difference between the air pressure in the first chamber 15 and the air pressure in the second chamber 17. As illustrated in FIG. 4A, on the center or approximately center of the opening plate 16, a differential pressure opening 16a, which narrows in a funnel shape, is formed. An identification number (identification information) according to the type is given to the opening plate 16.

In this embodiment, the differential pressure opening 16a narrows in the funnel shape. Alternatively, as illustrated in FIG. 4B, the shape of the opening plate 16 may be a flat plate. In this case, at the approximately center of the opening plate 16, a column-shaped differential pressure opening 16b may be formed.

Further, a position of forming the differential pressure opening 16a or 16b may be biased. For example, the differential pressure opening 16a or 16b may be located at a site close to the one end side of the opening plate 16. As the shape and the position of the differential pressure opening 16a or 16b at the opening plate 16, optimal shape and position according to the range of the measured airflow volume, the sizes and the shapes of the first chamber 15 and the second chamber 17, and the like can be employed appropriately.

Accordingly, when the sizes of the respective chambers of the first chamber 15 and the second chamber 17 are employed as a criterion, the shape, the position, and the like of the differential pressure opening 16a or 16b at the opening plate 16 can be determined according to the sizes of these chambers. This ensures restraining the increase in size of the first chamber 15 and the second chamber 17 more than necessity. That is, the downsizing of the first chamber 15 and the second chamber 17 can be ensured. Consequently, the downsizing of the gauging apparatus (the measurement device 1) can be ensured.

In this embodiment, the opening of the differential pressure opening 16a has the shape narrowing down to the funnel shape. Furthermore, the differential pressure opening 16a is formed at the approximately center of the opening plate 16. Accordingly, even if the opening plate 16 is employed as a criterion, the sizes of the first chamber 15 and the second chamber 17 can be restrained to be a minimum necessary size such that the air pressures in the respective chambers are stably measurable. This ensures downsizing the first chamber 15 and the second chamber 17.

Now returning the description to FIG. 3 again, the above-described controller 20 includes a power supply unit 21, which accumulates a power supply, a control board 22, and a display 23. The control board 22 calculates the airflow volume and the ventilation resistance. Furthermore, the control board 22 controls driving of the assistant fan 18. The display 23 displays the measured airflow volume, ventilation resistance, and the like. To the control board 22, the first pressure sensor 5a, the second pressure sensor 5b, and the assistant fan 18 are coupled, and the power supply unit 21 and the display 23 are also coupled.

The power supply unit 21 accumulates a power supply voltage from the outside. When the measurement device 1 is carried (when the measurement device 1 is disconnected from the external power supply), this power supply unit 21 ensures performing control by the control board 22. The power supply unit 21 may include a power supply plug instead of having a function of accumulating the power supply voltage from the outside. In this case, the power supply unit 21 may be configured such that electric power supplied from the outside through the power supply plug is supplied to the controller 20 and the like.

The control board 22 mounts various operating buttons 24 such that a measurer can perform various operations. The various operating buttons 24, for example, include a power supply button, which turns on the power supply for the measurement device 1, a measurement start button with which the measurements starts, and a setting button, which sets (or reads) the identification number of the mounted opening plate 16.

The control board 22 calculates the airflow volume and the ventilation resistance according to the measurement values measured by the first pressure sensor 5a and the second pressure sensor 5b and drives the assistant fan 18.

Figure 5:
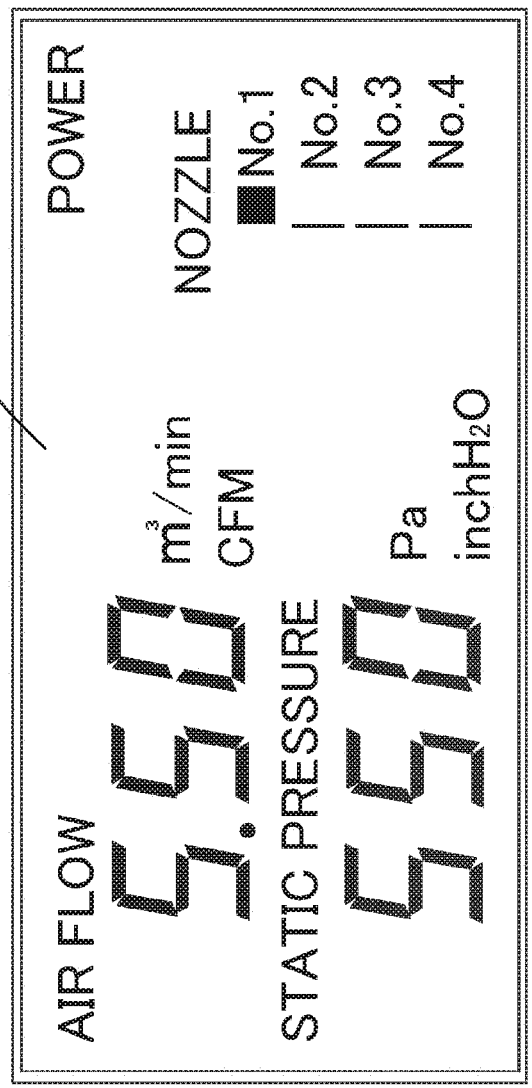
FIG. 5 illustrates an example of a display content displayed on a display of the measurement device.

FIG. 5 illustrates an example of a display content displayed on the display 23 of the measurement device 1.

As illustrated in FIG. 5, the display 23 displays the values of the airflow volume (AIR FLOW) and the ventilation resistance (STATIC PRESSURE) and at least displays the identification number (the identification information) of the opening plate 16 (NOZZLE). That is, the control board 22 displays, on the display 23, the identification number of the opening plate 16, which is installed inside the air duct 4.

The following describes an outline of a control until the display 23 displays the airflow volume and the ventilation resistance.

First, the second pressure sensor 5b measures the air pressures before and after the air passes through the opening plate 16 in the air duct 4. That is, the second pressure sensor 5b measures a differential pressure between the air pressure in the first chamber 15 obtained through the second opening 10b (a second pressure) and the air pressure in the second chamber 17 obtained through the third opening 10c (a third pressure). The second pressure sensor 5b outputs the measured differential pressure to the control board 22 as a second differential pressure value. The second pressure is air pressure from the straightening grid 14 to the opening plate 16. The third pressure is air pressure after the air has passed through the opening plate 16.

The control board 22 calculates the airflow volume of the air sent from the measurement-target wind-blowing apparatus on the basis of the second differential pressure value, which is input from the second pressure sensor 5b, the opening area of the opening plate 16, and the like.

The first pressure sensor 5a measures differential pressure (static pressure) between the air pressure before the air passes through the straightening grid 14 obtained through the first opening 10a (a first pressure) and atmospheric pressure of the outside air obtained through the first outside air port 11a or the second outside air port 11b. The first pressure sensor 5a outputs the measured differential pressure to the control board 22 as a first differential pressure value (a static pressure value). The first pressure is air pressure from the air inlet 2 to the straightening grid 14.

The control board 22 calculates the ventilation resistance of the air sent from the measurement-target wind-blowing apparatus on the basis of the first differential pressure value, which is input from the first pressure sensor 5a, and the calculated value of airflow volume. That is, the control board 22 calculates the airflow volume on the basis of the differential pressure between the second pressure and the third pressure and calculates the ventilation resistance on the basis of the calculated value of airflow volume and the value of first pressure.

Next, to display the calculated airflow volume and ventilation resistance on the display 23, the control board 22 outputs a display signal, which corresponds to the calculated values of airflow volume and ventilation resistance, to the display 23.

Thus, as illustrated in FIG. 5, the display 23 displays the values of airflow volume and ventilation resistance corresponding to the display signal input from the control board 22.

Figure 6:
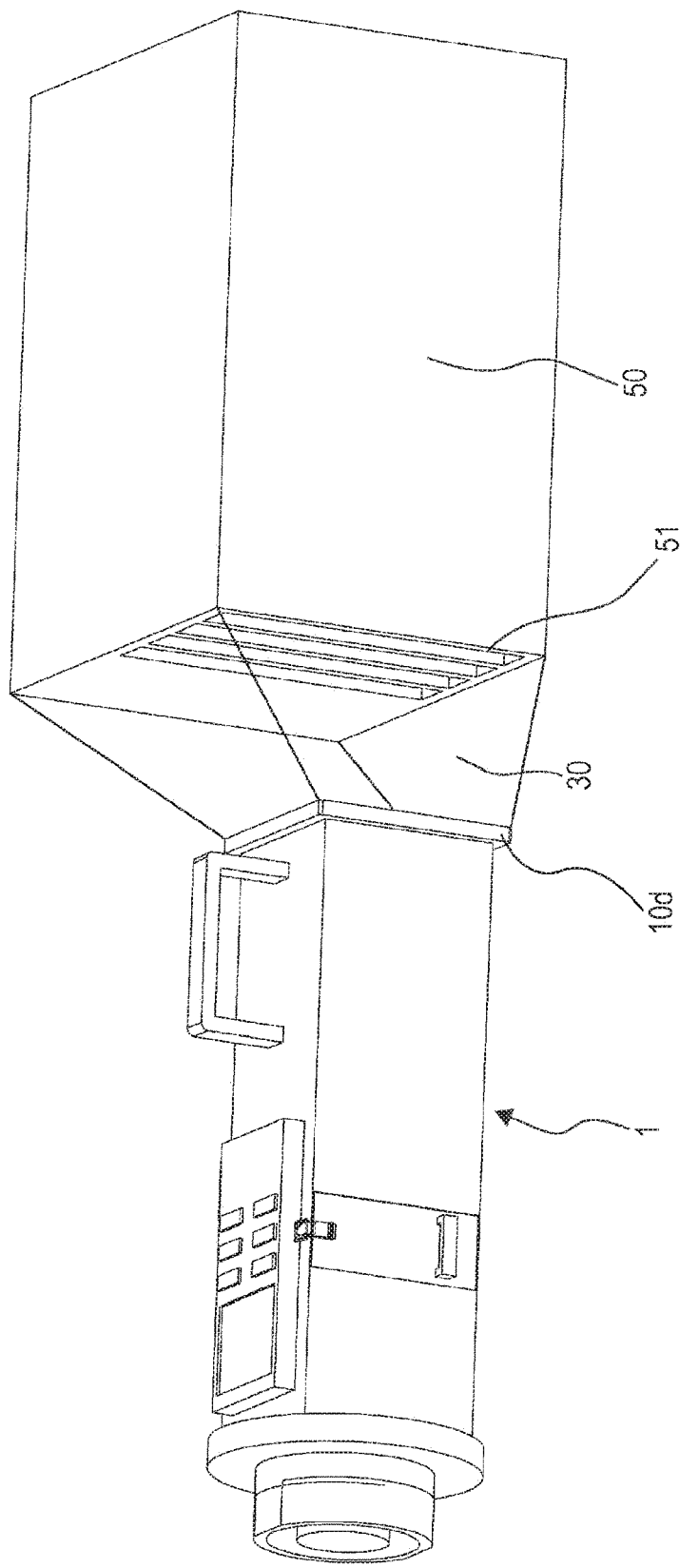
FIG. 6 illustrates an example of a method of using the measurement device.

FIG. 6 illustrates an example of a method of using the measurement device 1 to measure the airflow volume and the ventilation resistance of a measurement-target wind-blowing apparatus 50.

As illustrated in FIG. 2, the measurer releases the lock of the body lock 13f to the open/close lock 13g of the measurement device 1 to slide the open/close portion 13, thus opening the side surface of the air duct 4. The measurer disposes the opening plate 16 suitable for the airflow volume from the measurement-target wind-blowing apparatus 50 to be upright on the air duct 4. Furthermore, the measurer slides the open/close portion 13 to obstruct the side surface of the air duct 4 and locks the body lock 13f and the open/close lock 13g.

Next, as illustrated in FIG. 6, the measurer installs the coupling duct 30 to an air-sending port 51 of the measurement-target wind-blowing apparatus 50 and the flange 10d of the measurement device 1. The coupling duct 30 is a member that forms a second air duct 44 (see FIG. 8) between the measurement device 1 and the wind-blowing apparatus 50.

The measurer operates the power supply button for the controller 20 to power-on the measurement device 1. Furthermore, the measurer operates the measurement start button to start the measurement. Afterwards, when the control board 22 completes calculating the airflow volume and the ventilation resistance, the display 23 displays the values of the airflow volume and the ventilation resistance.

As described above, with the measurement device 1 of this embodiment, sliding the open/close portion 13 and opening the side surface of the air duct 4 allows installing various kinds of the opening plates 16 that support the airflow volume from the measurement-target wind-blowing apparatus. That is, with the measurement device 1, the opening plate 16 disposed in the air duct 4 is replaceable. This allows the measurement device 1 to support the airflow volumes in various ranges (have high versatility).

In this embodiment, the measurement device 1 includes the two differential pressure sensors, the first pressure sensor 5a and the second pressure sensor 5b. Instead of the differential pressure sensors, the measurement device 1 may include the following four pressure sensors. That is, the measurement device 1 may include a pressure sensor to measure atmospheric pressure, a pressure sensor to measure the static pressure of the first opening 10a, a pressure sensor to measure the static pressure of the second opening 10b, and a pressure sensor to measure the static pressure of the third opening 10c.

Furthermore, the measurement device 1 of this embodiment includes the controller 20 mounted to the casing 10. Alternatively, the measurement device 1 may not include the controller 20. For example, instead of the controller 20, the measurement device 1 may include a controller (an external controller) such as a personal computer as am external device (for example, a device separated from the casing). In this case, for example, the measurement values measured by the first pressure sensor 5a and the second pressure sensor 5b may be input to the external controller. Furthermore, the external controller may calculate the values of the airflow volume and the ventilation resistance and display these values on the display 23 (or on another monitor).

Furthermore, in this embodiment, the controller 20 of the measurement device 1 includes the display 23, which displays the airflow volume, the ventilation resistance, and the like. However, the controller 20 of the measurement device 1 may not include the display 23. For example, the controller 20 may be configured to be couplable to an external display such as an LCD monitor. In this case, the controller 20 may output the display signal to the external display to display the values of the airflow volume and the ventilation resistance on the external display.

Furthermore, in this embodiment, the opening plate 16, which is disposed upright on the air duct 4, is secured to one position on the air duct 4 with each one of the upright-holder 10g and the restricting portion 13e (the open/close portion 13). Alternatively, the measurement device 1 may include the plurality of upright-holders 10g and restricting portions 13e (the open/close portions 13). In this case, the opening plate 16 can be secured (installed) at any of the plurality of positions between the second opening 10b and the third opening 10c on the air duct 4. This ensures changing the sizes of the first chamber 15 and the second chamber 17. This allows the measurement device 1 to support the airflow volumes in wider ranges (have higher versatility).

Furthermore, in this embodiment, the upright-holder 10g and the restricting portion 13e restrict the motion of the opening plate 16, which is disposed upright on the air duct 4, to the longitudinal direction of the air duct 4. Alternatively, the opening plate 16 may be constituted to be movable to the longitudinal direction of the air duct 4. For example, the opening plate 16 may be constituted to be movable to the longitudinal direction of the air duct 4 between the second opening 10b and the third opening 10c on the air duct 4. In this case, to restrain the position of the opening plate 16 moved to the longitudinal direction of the air duct 4 to be displaced due to the air sent from the wind-blowing apparatus, it is preferable to dispose a lock mechanism to secure the opening plate 16 at the measurement device 1 (the air duct 4). For example, the upright-holder 10g and the restricting portion 13e may be configured to be slidable to the longitudinal direction of the air duct 4, and additionally the lock mechanism, which secures the upright-holder 10g and the restricting portion 13e, may be disposed at the measurement device 1 (the air duct 4). This also ensures changing the sizes of the first chamber 15 and the second chamber 17. This allows the measurement device 1 to support wider airflow volumes from the wind-blowing apparatus (have higher versatility).

In this embodiment, the coupling duct 30 can also be configured as a part of the components of the measurement device 1. Alternatively, the coupling duct 30 can also be configured as a different member from the measurement device 1. If the coupling duct 30 is configured as a part of the measurement device 1, the measurement device 1 may include, for example, an appropriate mounting member for installing the coupling duct 30 to the flange 10d to enable detachable installation of the coupling duct 30 to the measurement device 1.

Figure 7:
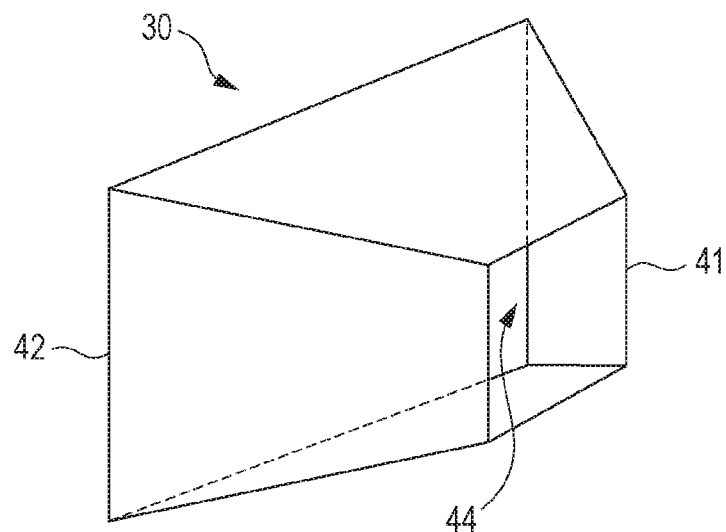
FIG. 7 is a transparent view illustrating an example of a coupling duct.
Figure 8:
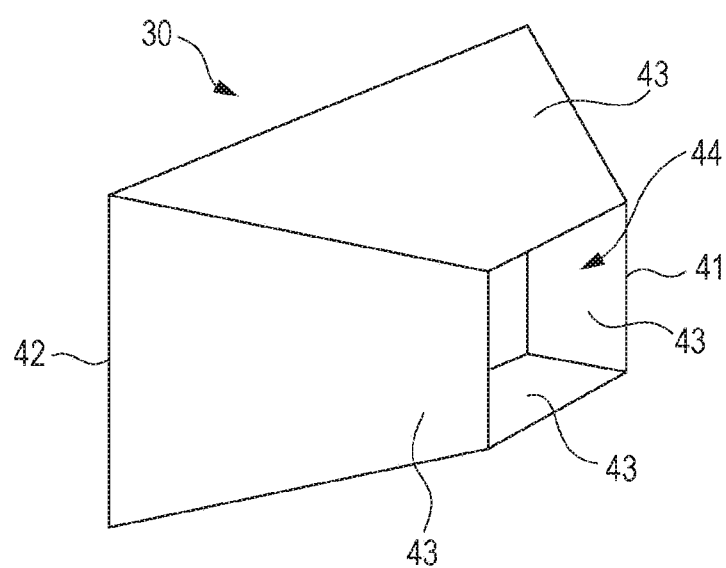
FIG. 8 is a perspective view illustrating an example of the coupling duct.

As illustrated in FIGS. 7 and 8, in this embodiment, the coupling duct 30 includes a first opening 41 that is mounted to the air inlet 2 (that is, the flange 10d) of the measurement device 1, and a second opening 42 that is mounted to the air-sending port 51 of the wind-blowing apparatus 50. It is considered that the air-sending port 51 is larger than the flange 10d in many cases where the measurement device 1 is downsized. Hence, it is desired to form the second opening 42 in such a manner as to have a larger opening size than the first opening 41.

In this embodiment, the coupling duct 30 includes an air duct wall member 43. The air duct wall member 43 forms an air duct (second air duct) 44 between the first opening 41 and the second opening 42. That is, the air duct wall member 43 forms an air duct wall of the second air duct 44. The second air duct 44 communicates with, for example, the air duct 4 (the first air duct). The air duct wall member 43 seals the second air duct 44 substantially hermetically (that is, to the degree that there is no harm in measuring the airflow volume and the ventilation resistance). The air duct wall member 43 can also be formed of, for example, a foldable material such as polyurethane. In this case, the air duct wall member 43 is foldable. This ensures folding the air duct wall portion of the coupling duct 30. As a result, the portability of the coupling duct 30 can be increased.

Figure 9:
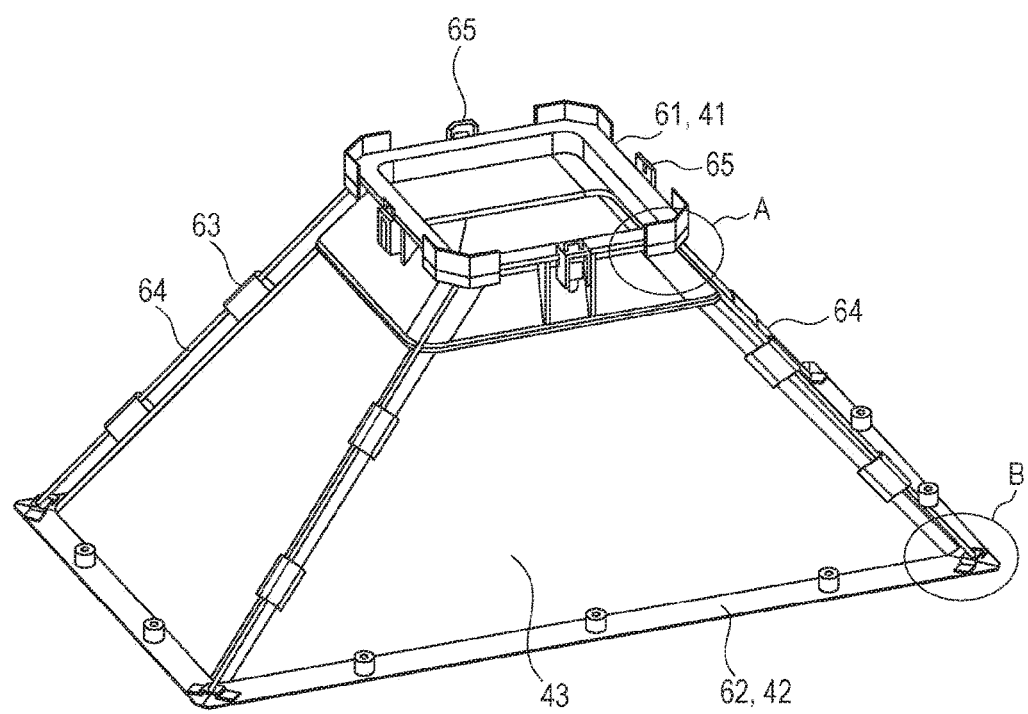
FIG. 9 illustrates an example of the coupling duct.

FIG. 9 illustrates an example of the coupling duct 30. The coupling duct 30 illustrated in FIG. 9 includes a first opening member 61, a second opening member 62, the air duct wall member 43, sleeves 63, and four support rods 64.

The first opening member 61 defines the first opening 41. The first opening member 61 is configured to be engaged with (fixed to) the flange 10d of the casing 10. The first opening member 61 is, for example, a rectangular frame having an opening. The first opening member 61 may include, for example, four engagement fittings (mounting members) 65 for ensuring engagement between the first opening member 61 and the flange 10d.

The second opening member 62 defines the second opening 42. The second opening member 62 is configured to be engaged with (fixed to) the air-sending port 51 (or a flange disposed on the air-sending port 51) of the wind-blowing apparatus 50. The second opening member 62 is, for example, a rectangular frame having a larger opening than the first opening member 61.

The first opening member 61 and the second opening member 62 are made of, for example, resin. The material of the first opening member 61 and the second opening member 62 may be the same as, for example, the material of the casing 10.

The air duct wall member 43 has, for example, a substantially square pyramid shape (having a rectangular base) with the apex truncated. A first end (a narrower end) of the air duct wall member 43 is mounted to four sides of the first opening member 61 with substantially no gap. A second end (a wider end) of the air duct wall member 43 is mounted to four sides of the second opening member 62 with substantially no gap. In this manner, the air duct wall member 43 is disposed between the first opening member 61 and the second opening member 62 to form the above-described second air duct 44 (see FIG. 8). The material of the air duct wall member 43 may be, for example, a foldable material such as polyurethane as described above. The air duct wall member 43 may be detachably mounted to the first opening member 61 and/or the second opening member 62.

The support rods 64 are disposed on four sides of the coupling duct 30 along the second air duct 44. The support rods 64 support the first opening member 61, the second opening member 62, and the air duct wall member 43 to hold the shape of the coupling duct 30. The support rod 64 is made of, for example, stainless steel. The support rod 64 may be a hollow rod (pipe) or solid rod.

The sleeves 63 are disposed on the air duct wall member 43 to engage the support rods 64 and the air duct wall member 43. That is, the sleeve 63 is configured to pass the support rod 64 through it.

Figure 10:
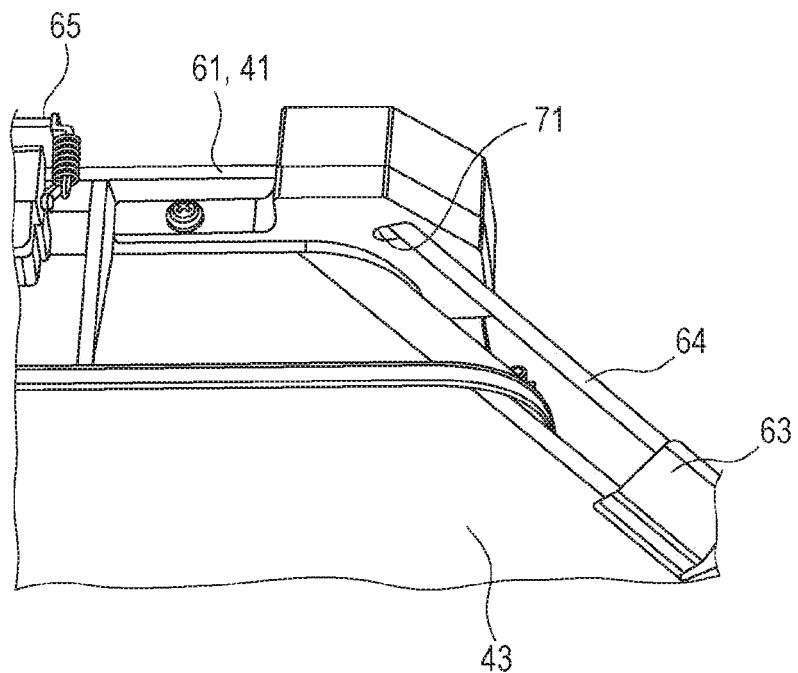
FIG. 10 is a partially enlarged view of the coupling duct illustrated in FIG. 9.
Figure 11:
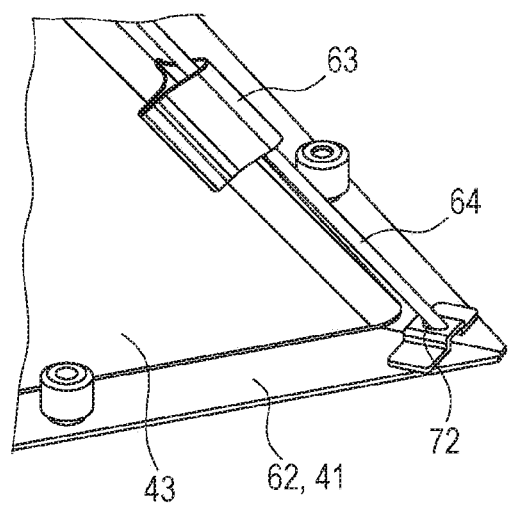
FIG. 11 is a partially enlarged view of the coupling duct illustrated in FIG. 9.

FIG. 10 is an enlarged view of a portion, which is near a circle A, of the coupling duct 30 illustrated in FIG. 9. As illustrated in FIG. 10, an end on the first opening member 61 side of the support rod 64 is detachably engaged in a first hook hole 71 disposed at a corner of the first opening member 61. On the other hand, FIG. 11 is an enlarged view of a portion, which is near a circle B, of the coupling duct 30 illustrated in FIG. 9. As illustrated in FIG. 11, an end on the second opening member 62 side of the support rod 64 is detachably engaged in a second hook hole 72 disposed at a corner of the second opening member 62.

In the coupling duct 30 illustrated in FIGS. 9 to 11, the support rod 64 can be removed from the first hook hole 71 of the first opening member 61 and the second hook hole 72 of the second opening member 62, and can be pulled out of the sleeve 63. That is, in this example, the four support rods 64 can be removed from the coupling duct 30. Therefore, if the air duct wall member 43 is formed of a foldable material, the removal of the support rods 64 from the coupling duct 30 and the folding of the air duct wall member 43 ensure reducing the volume of the coupling duct 30. As a result, the portability of the coupling duct 30 can be increased.

Moreover, if the air duct wall member 43 is configured to be removable from the first opening member 61 and the second opening member 62, the coupling duct 30 can be disassembled to the first opening member 61, the second opening member 62, the air duct wall member 43, and the support rods 64. Therefore, the portability of the coupling duct 30 can be further increased.

The coupling duct 30 illustrated in FIGS. 9 to 11 is a mere example. The coupling duct 30 including the foldable air duct wall member 43 may have another structure. For example, the coupling duct 30 may include the extendable bellows-like air duct wall member 43. Also in this case, the air duct wall member 43 is foldable. Moreover, the air duct wall member 43 of the coupling duct 30 may not be foldable.

In this embodiment, the measurement device 1 measures the airflow volume and the ventilation resistance of the wind-blowing apparatus. Alternatively, while measuring the airflow volume of the wind-blowing apparatus, the measurement device 1 may not measure the ventilation resistance.

In this embodiment, the measurement device 1 includes the straightening grid 14 and the assistant fan 18. Alternatively, the measurement device 1 may not include the straightening grid 14 and the assistant fan 18. In this case, the control board 22 may use the measurement values of the air pressures (the pressure difference) before and after the air passes through the opening plate 16, which are obtained by the second pressure sensor 5b, to calculate the airflow volume and the ventilation resistance of the wind-blowing apparatus. Further, the control board 22 may display the calculated airflow volume and ventilation resistance on the display 23.

The first valve 7a may be configured to adjust whether to send out the air from the first opening 10a, which is input through the distributor 8, to the third tube 9c; or to send out the outside air, which is input through the first outside air port 11a, to the third tube 9c by rotation of the cross-shaped adjuster. When the arrow of the adjuster at the first valve 7a indicates the distributor 8 side or the upper side, the first valve 7a may send out the air from the first opening 10a, which is input through the distributor 8, to the third tube 9c.

The second valve 7b may be configured to adjust whether to send out the air from the first opening 10a, which is input through the second tube 9b, to the fourth tube 9d; or to send out the outside air, which is input through the second outside air port 11b, to the fourth tube 9d by rotation of the cross-shaped adjuster. When the arrow of the adjuster at the second valve 7b indicates the relay board 6 side or the upper side, the second valve 7b may send out the outside air, which is input through the second outside air port 11b, to the fourth tube 9d.

On the second side surface of the casing 10 in the second direction, to ensure replacement of the opening plate 16, the specific opening 10f, which is open at the side surface of the air duct 4, may be formed on the opposed surface opposed to the side surface of the opening plate 16.

The measurement device according to this embodiment may be the following first to seventh measurement devices.

The first measurement device is configured as follows. The measurement device includes a casing forming an air duct. The air duct includes an air inlet. The air inlet is configured to take in air sent from outside. The measurement device measures an airflow volume and a ventilation resistance. The air duct includes a straightening grid, a first chamber, an opening plate, a second chamber, and pressure sensors. The straightening grid is configured to straighten the air taken from the air inlet. Air that has passed through the straightening grid is taken in the first chamber. The opening plate includes an opening through which the air taken in the first chamber is passable. Air that has passed through the opening of the opening plate is taken in the second chamber. The pressure sensors are configured to measure a first pressure, a second pressure, and a third pressure. The first pressure is air pressure from the air inlet to the straightening grid. The second pressure is air pressure in the first chamber. The third pressure is air pressure in the second chamber. The casing includes a specific opening that opens a side surface of the air duct such that the opening plate is replaceable. The casing includes an open/close portion. The specific opening is closable/openable by the open/close portion. The measurement device further includes a duct forming a second air duct between the measurement device and its measurement target.

The second measurement device according to the first measurement device is configured as follows. The duct includes a first opening and a second opening. The first opening is mounted to the measurement device. The second opening is mounted to the measurement target. The opening size of the second opening is formed to be larger than that of the first opening.

The third measurement device according to the second measurement device is configured as follows. The duct includes an air duct wall member forming an air duct wall of the second air duct. The air duct wall member is formed of a foldable material.

The fourth measurement device according to any one of the first to third measurement devices is configured as follows. The casing is made of a resin material. To the casing, a control board and a display are mounted. The control board is coupled to the pressure sensors. The control board is configured to calculate the airflow volume and the ventilation resistance. The display is configured to display the airflow volume and ventilation resistance calculated by the control board.

The fifth measurement device according to the fourth measurement device is configured as follows. The control board is configured to calculate the airflow volume on the basis of a differential pressure between the second pressure and the third pressure measured by the pressure sensors. The control board is configured to calculate the ventilation resistance on the basis of the calculated airflow volume and the first pressure measured by the pressure sensor.

The sixth measurement device according to any one of the first to fifth measurement devices is configured as follows. An assistant fan is disposed at an air outlet opposite to the air inlet on the air duct. The assistant fan is configured to send out air in the air duct to the outside.

The seventh measurement device is configured as follows. The measurement device includes a casing forming an air duct. The air duct includes an air inlet. The air inlet is configured to take in air sent from outside. The measurement device measures an airflow volume and a ventilation resistance. The air duct includes a straightening grid, a first chamber, an opening plate, a second chamber, and pressure sensors. The straightening grid is configured to straighten the air taken from the air inlet. Air that has passed through the straightening grid is taken in the first chamber. The opening plate includes an opening through which the air taken in the first chamber is passable. Air that has passed through the opening of the opening plate is taken in the second chamber. The pressure sensors are configured to measure a first pressure, a second pressure, and a third pressure. The first pressure is air pressure from the air inlet to the straightening grid. The second pressure is air pressure in the first chamber. The third pressure is air pressure in the second chamber. The casing includes a specific opening that opens a side surface of the air duct such that the opening plate is replaceable. The casing includes an open/close portion. The specific opening is closable/openable by the open/close portion.

In the seventh measurement device, the open/close portion opens the side surface of the air duct to ensure changes to various kinds of opening plates. This ensures enhancing versatility of the measurement device to measure the airflow volume and the ventilation resistance. Additionally, when the size of the chamber is employed as a criterion, the opening area and the position of the opening of the opening plate according to the size of the chamber can be also determined. This avoids increasing the size of the chamber more than necessity and therefore this ensures downsizing the gauging apparatus.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A measurement device for measuring an airflow volume and a ventilation resistance, comprising:
   a casing that includes a first air duct with an air inlet, the air inlet being configured to take in air;
   a straightening grid provided in the first air duct, the straightening grid being configured to straighten the air taken from the air inlet;
   a first chamber provided in the first air duct, in which air that has passed through the straightening grid is taken;

an opening plate provided in the first air duct, the opening plate including an opening allowing the air taken in the first chamber to pass therethrough;

a second chamber provided in the first air duct, in which air that has passed through the opening of the opening plate is taken;

pressure sensors provided to the first air duct, the pressure sensors being configured to measure a first pressure, a second pressure, and a third pressure, the first pressure being air pressure from the air inlet to the straightening grid, the second pressure being air pressure in the first chamber, the third pressure being air pressure in the second chamber;

a specific opening disposed in a part of the first air duct, the specific opening being configured to allow the opening plate to be replaceable;

an open/close portion configured to open and close the specific opening; and a duct forming a second air duct between the measurement device and a measurement target, wherein the pressure sensors comprise:

a first pressure sensor configured to measure a first differential pressure value between the first pressure and an atmospheric pressure; and a second pressure sensor configured to measure a second differential pressure value between the second pressure and the third pressure, and the measurement device further comprises a control board coupled to the first pressure sensor and the second pressure sensor, the control board being configured to calculate the airflow volume on the basis of the second differential pressure value and to calculate the ventilation resistance on the basis of the calculated airflow volume and the first differential pressure value.

2. The measurement device according to claim 1, wherein the second air duct includes a first opening that is installed to the measurement device, and a second opening that is installed to the measurement target, and an opening size of the second opening is larger than that of the first opening.

3. The measurement device according to claim 2, wherein The second air duct includes an air duct wall member that forms an air duct wall of the second air duct, and the air duct wall member is formed of a foldable material.

4. The measurement device according to claim 3, wherein the casing is made of a resin material, and to the casing, a display is mounted, the display being configured to display the airflow volume and the ventilation resistance calculated by the control board.

5. The measurement device according to claim 3, wherein The second air duct includes sleeves and support rods, wherein the support rods are mounted to the second air duct detachably to hold a shape of the second air duct, wherein the sleeves are disposed on the air duct wall member, and the sleeves are configured to pass the support rods through each of the sleeves.

6. The measurement device according to claim 2, wherein the casing is made of a resin material, and to the casing, a display is mounted, the display being configured to display the airflow volume and the ventilation resistance calculated by the control board.

7. The measurement device according to claim 1, wherein the casing is made of a resin material, and to the casing, a display is mounted, the display being configured to display the airflow volume and the ventilation resistance calculated by the control board.

8. The measurement device according to claim 1, further comprising an assistant fan disposed at an air outlet, the air outlet being disposed opposite to the air inlet in the first air duct, the assistant fan being configured to send out air in the first air duct to outside.

9. A measurement device for measuring an airflow volume and a ventilation resistance, comprising:

a casing that includes a first air duct with an air inlet, the air inlet being configured to take in air;

a straightening grid provided in the first air duct, the straightening grid being configured to straighten the air taken from the air inlet;

a first chamber provided in the first air duct, in which air that has passed through the straightening grid is taken;

an opening plate provided in the first air duct, the opening plate including an opening allowing the air taken in the first chamber to pass therethrough;

a second chamber provided in the first air duct, in which air that has passed through the opening of the opening plate is taken;

pressure sensors provided to the first air duct, the pressure sensors being configured to measure a first pressure, a second pressure, and a third pressure, the first pressure being air pressure from the air inlet to the straightening grid, the second pressure being air pressure in the first chamber, the third pressure being air pressure in the second chamber;

a specific opening disposed in a part of the first air duct, the specific opening being configured to allow the opening plate to be replaceable;

an open/close portion configured to open and close the specific opening, the open/close portion comprising a guide rail, the open/close portion being slidable in a vertical direction with respect to a longitudinal direction of the first air duct by the guide rail; and a duct forming a second air duct between the measurement device and a measurement target, wherein the pressure sensors comprise:

a first pressure sensor configured to measure a first differential pressure value between the first pressure and an atmospheric pressure; and a second pressure sensor configured to measure a second differential pressure value between the second pressure and the third pressure, and the measurement device further comprises a control board coupled to the first pressure sensor and the second pressure sensor, the control board being configured to calculate the airflow volume on the basis of the second differential pressure value and to calculate the ventilation resistance on the basis of the calculated airflow volume and the first differential pressure value.

10. A measurement device for measuring an airflow volume and a ventilation resistance, comprising:

a casing that includes a first air duct with an air inlet, the air inlet being configured to take in air;

a straightening grid provided in the first air duct, the straightening grid being configured to straighten the air taken from the air inlet;

a first chamber provided in the first air duct, in which air that has passed through the straightening grid is taken;

an opening plate provided in the first air duct, the opening plate including an opening allowing the air taken in the first chamber to pass therethrough;

an upright-holder that holds the opening plate to be disposed upright on the first air duct; a second chamber provided in the first air duct, in which air that has passed through the opening of the opening plate is taken;

pressure sensors provided to the first air duct, the pressure sensors being configured to measure a first pressure, a second pressure, and a third pressure, the first pressure being air pressure from the air inlet to the straightening grid, the second pressure being air pressure in the first chamber, the third pressure being air pressure in the second chamber;

a specific opening disposed in a part of the first air duct, the specific opening being configured to allow the opening plate to be replaceable;

an open/close portion configured to open and close the specific opening, the open/close portion comprising a restricting portion that causes the opening plate to be disposed upright on the first air duct and restricts a movement of the opening plate in a longitudinal direction of the first air duct; and a duct forming a second air duct between the measurement device and a measurement target, wherein the upright-holder and the restricting potion are slidable to the longitudinal direction of the first air duct, wherein the pressure sensors comprise:

a first pressure sensor configured to measure a first differential pressure value between the first pressure and an atmospheric pressure; and a second pressure sensor configured to measure a second differential pressure value between the second pressure and the third pressure, and the measurement device further comprises a control board coupled to the first pressure sensor and the second pressure sensor, the control board being configured to calculate the airflow volume on the basis of the second differential pressure value and to calculate the ventilation resistance on the basis of the calculated airflow volume and the first differential pressure value.

* * * * *